Jan. 31, 1939.　　A. J. LEWIS ET AL　　2,145,310
MACHINE TOOL
Filed March 13, 1937　　5 Sheets-Sheet 1

INVENTORS
Arthur J. Lewis
BY Earl C. Bunnell
Wooster & Davis
ATTORNEYS.

Jan. 31, 1939.   A. J. LEWIS ET AL   2,145,310
MACHINE TOOL
Filed March 13, 1937   5 Sheets-Sheet 2

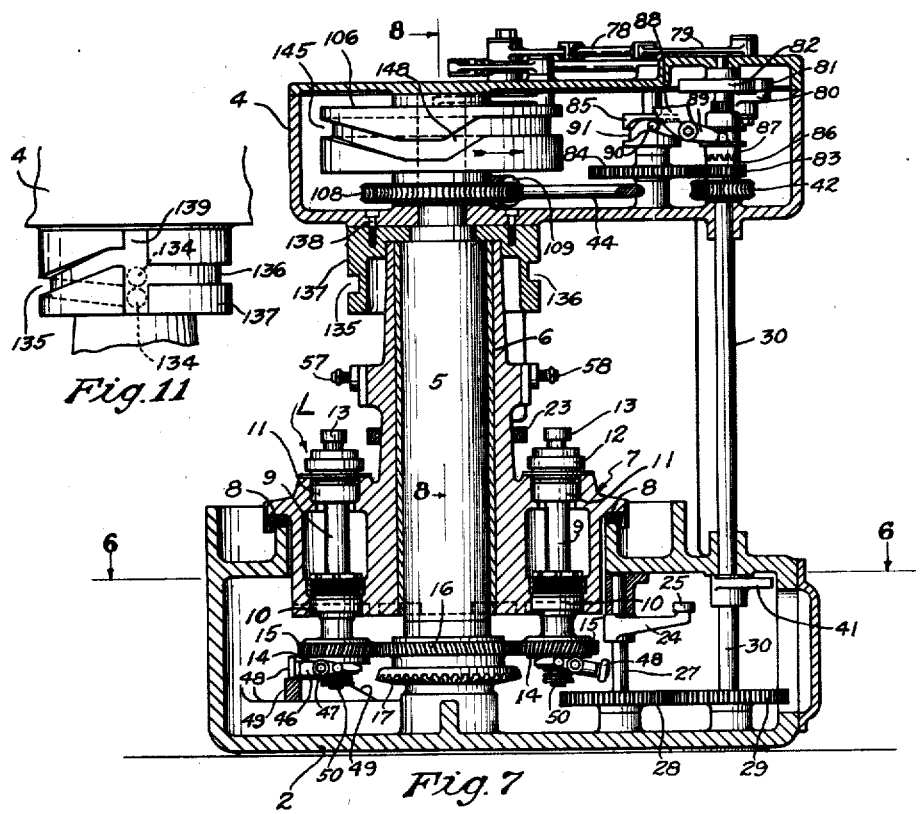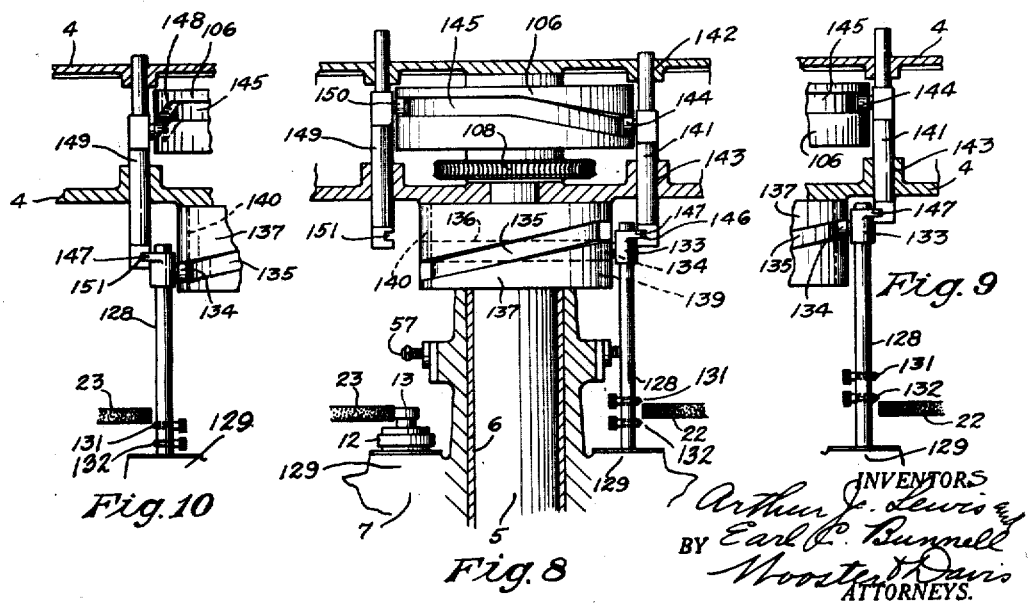

Jan. 31, 1939.  A. J. LEWIS ET AL  2,145,310
MACHINE TOOL
Filed March 13, 1937  5 Sheets-Sheet 5
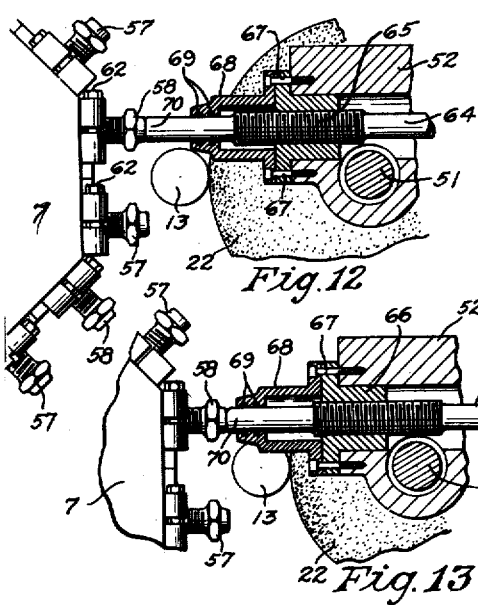
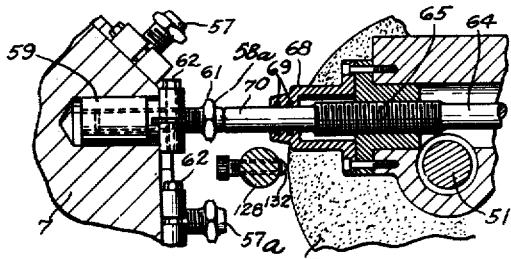
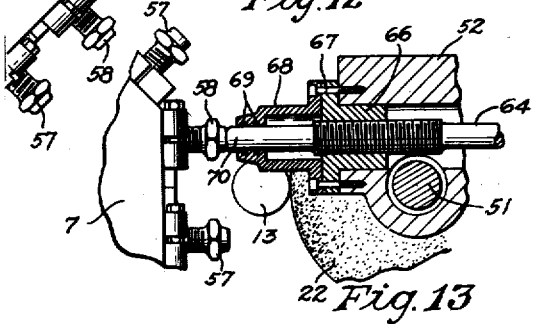
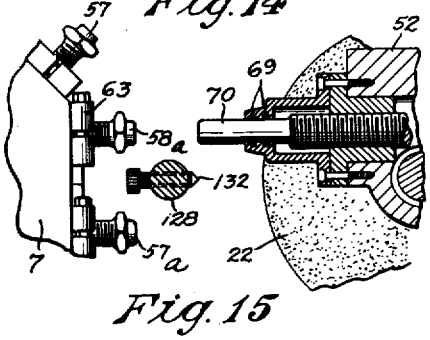
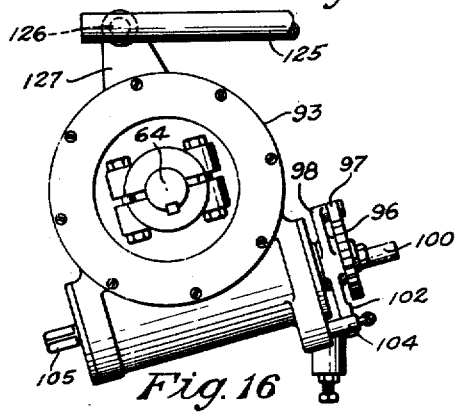
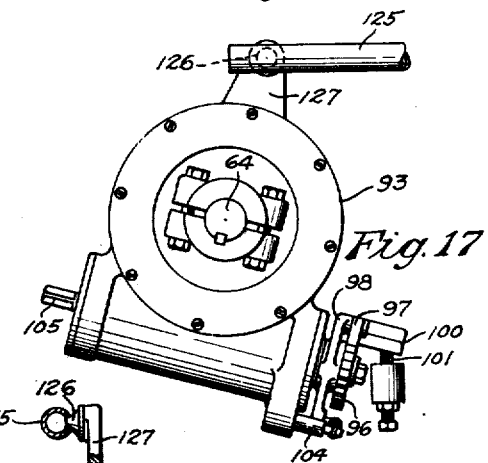
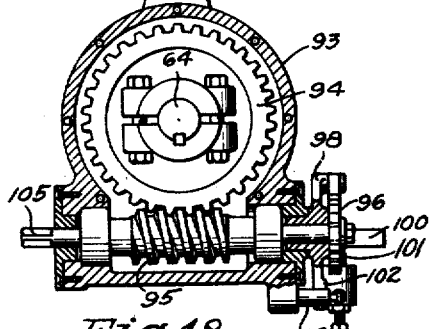
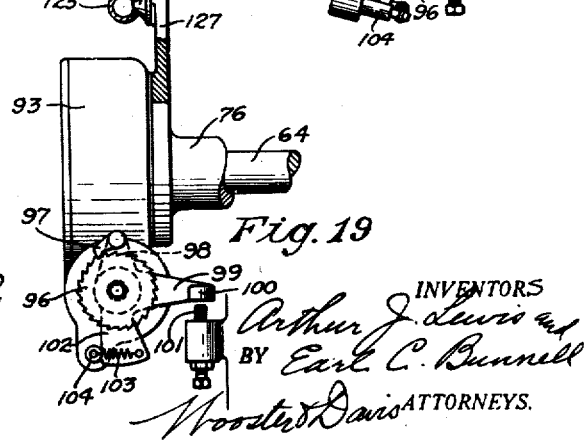

Patented Jan. 31, 1939

2,145,310

UNITED STATES PATENT OFFICE 2,145,310

MACHINE TOOL

Arthur J. Lewis and Earl C. Bunnell, Stratford, Conn., assignors to The Baird Machine Company, Bridgeport, Conn., a corporation of Connecticut Application March 13, 1937, Serial No. 130,665

24 Claims. (Cl. 51—108)

This invention relates to a machine tool for performing one or more operations on a work piece or a series of work pieces in succession, and has for an object to provide an improved tool feeding means including means for positioning the tool relative to the work at the beginning of the working operation and to feed the tool from this positioning means during the working operation.

Another object is to provide a machine having a rotatable turret carrying a plurality of work holders and one or more tools to perform operations on the work pieces in succession together with a feeding point associated with each work holder and means cooperating with said feeding point to properly locate the tool at the beginning of each working operation, so that the tool will be properly located for each individual operation, and then feeding the tool during the working operation from this feeding point.

A further object is to provide means where the device is used in a grinding machine to automatically compensate for the wear of the grinding wheel, and to dress the grinding wheel automatically after a given number of grinding operations, especially to redress it to a certain definite relation to the tool feed control means, and thus secure more accurate and uniform operations on any number of separate work pieces indefinitely.

With the foregoing and other objects in view we have devised machines, one form of which is shown in the accompanying drawings as illustrating the principles and operation of the invention. It will of course be understood that various changes and modifications may be employed in carrying out the invention and accomplishing the objects desired.

In these drawings:

Fig. 7 is a vertical section substantially on line 7—7 of Fig. 1;

Fig. 8 is a detail vertical section substantially on line 8—8 of Fig. 7;

Fig. 9 is a view of the wheel dressing device at the right hand of Fig. 8 showing it in position for dressing the roughing wheel;

Fig. 10 is a similar view of the dressing device at the left hand of Fig. 8 showing it in position after dressing the finishing wheel;

Fig. 11 is an elevational view of the stationary cam looking from the right of Fig. 8;

Fig. 12 is a detail view partly in section and partly in elevation indicating the locating of the tool and the control of the feed;

Fig. 13 is a similar view showing another location of the tool;

Fig. 14 shows the location of the grinding wheel for the dressing operation;

Fig. 15 shows the elements of Fig. 14 with the wheel retracted;

Fig. 16 is an end view of the feed mechanism in one position;

Fig. 17 is a similar view showing it in another position to position the wheel to compensate for wear;

Fig. 18 is a transverse section through the feed mechanism; and

Fig. 19 is an elevation of this mechanism looking from the right of Fig. 18 with parts broken away.

Figure 1:
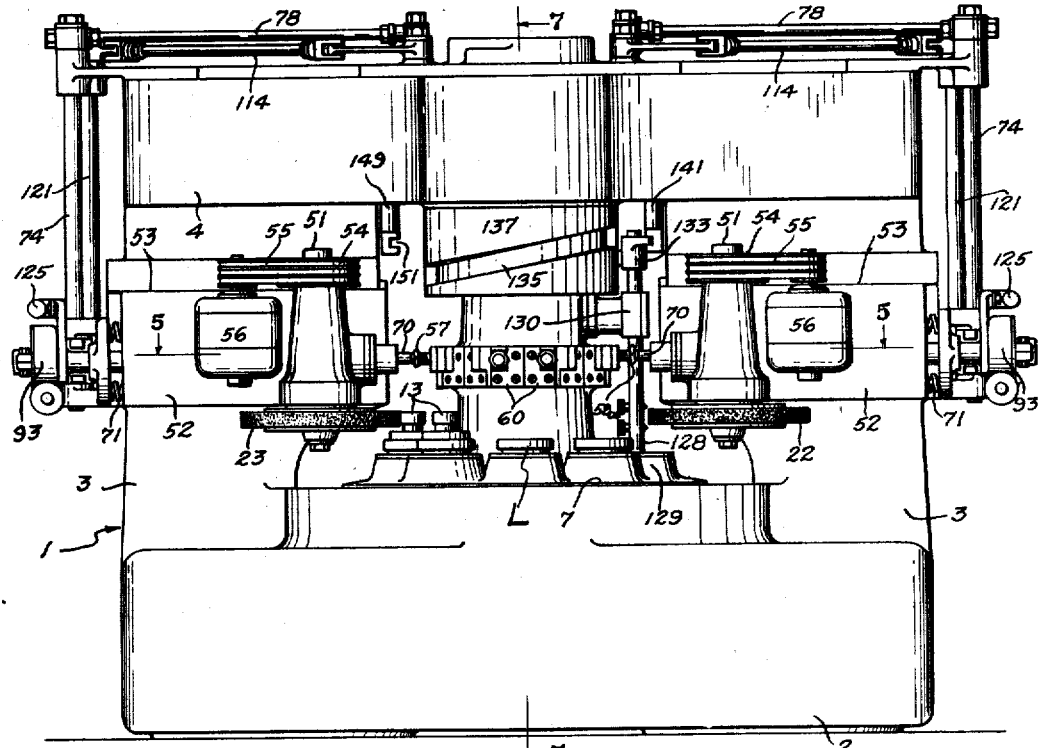
Fig. 1 is a front elevation of a grinding machine showing our invention applied thereto.

For the purposes of illustration the invention is shown as applied to a grinding machine for grinding operations on a series of work pieces in succession, but it will be evident that the principles of the invention may be applied to other types of machine tools performing other operations on the work such for example as turning, boring, chucking machines, etc.

The machine shown comprises a frame or housing 1 including a bed or base 2, uprights 3, and an upper part 4 extending between and connecting the uprights. Extending vertically between the base and the upper part 4 is a cylindrical post 5 surrounded by a sleeve 6 on which a work carrying turret 7 is mounted for turning and indexing. Post 5 is supported at its upper and lower ends in the upper portion 4 and the base 2 respectively and acts as a positioning means for the turret, which however is supported and turns on an annular bearing 8 on the base. This turret carries a plurality of work carrying spindles 9 having spaced bearings 10 and 11 in the turret in which they are mounted for rotary movement, and carry at their upper ends any suitable holder such as chucks 12 for work pieces 13 to be operated upon. The spindles 9 are driven through releasable friction clutch members 14 at their lower ends movable to and from engagement with other clutch members in gears 15 meshing with a central gear 16 mounted to turn on the post 5 and driven in turn by a bevel gear 17 meshing with a bevel driving pinion 18 on the shaft 19 driven by pulley 20 from any suitable source of power, not shown. This turret, as will be seen from Figs. 5 and 6 has eight stations in the present instance, although it will be understood that these may be varied in number as desired. In the present case there are seven spindles 9 at seven of these stations while the eighth station indicated at 21 is the grinding wheel dressing station, having at this station no work carrying spindle, but instead a device for dressing the surfaces of the grinding wheels, as will later be described.

Figure 5:
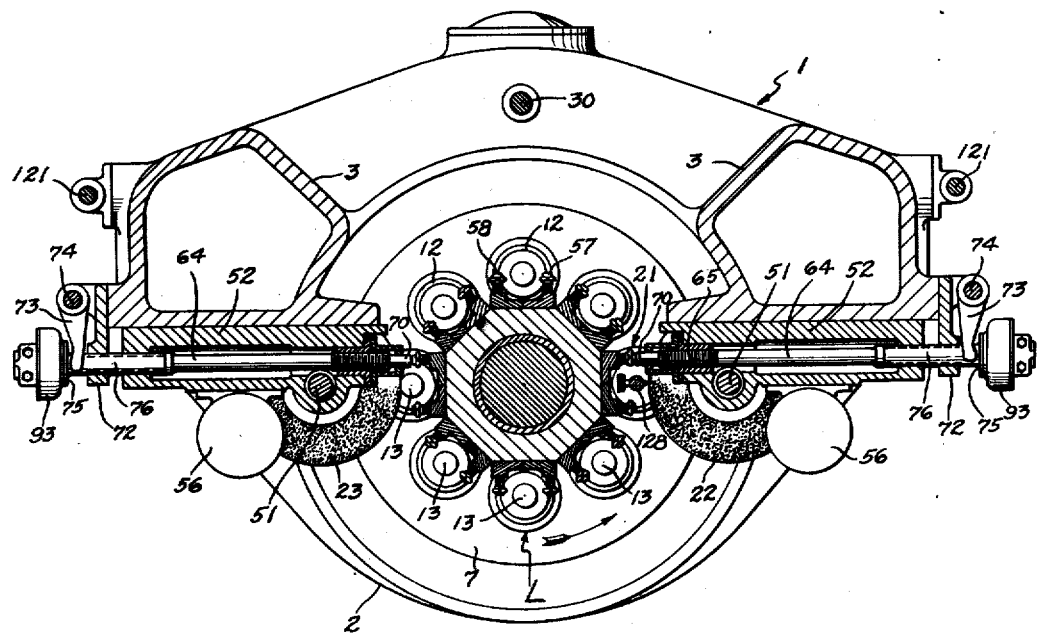
Fig. 5 is a transverse section substantially on line 5—5 of Fig. 1.
Figure 6:
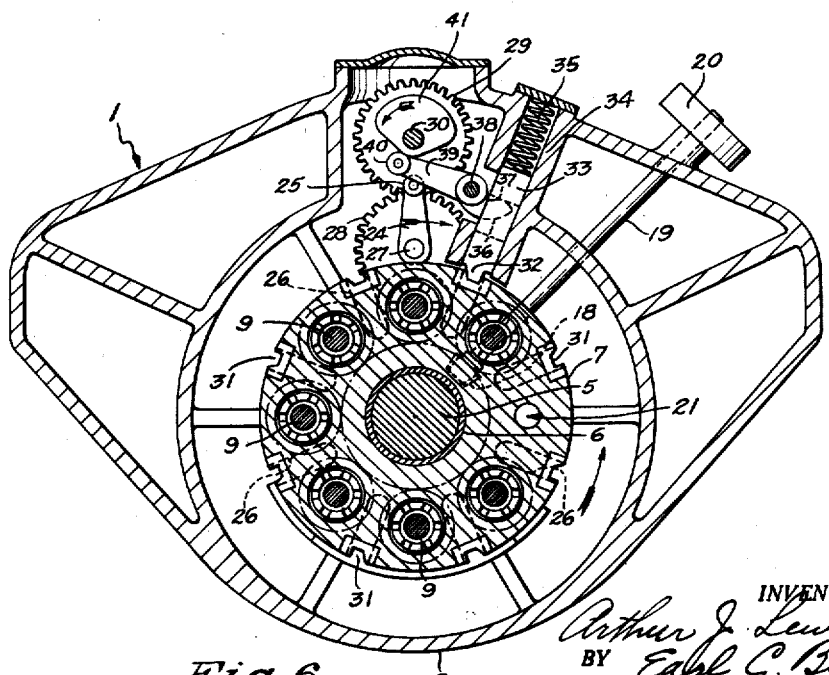
Fig. 6 is a transverse section substantially on line 6—6 of Fig. 7.

On opposite sides of the turret in the present instance are located two grinding wheels 22 and 23, the wheel 22 being a roughing wheel and the wheel 23 a finishing wheel, and the turret 7 is indexed with a step by step movement counter-clockwise as viewed in Figs. 5 and 6 by a Geneva movement, the arm of which is shown at 24 (Figs. 6 and 7) carrying a roller 25 adapted on each revolution to engage in succession the radial slots 26 extending inwardly from the periphery of the turret at the lower end thereof. This arm 24 is carried on a shaft 27 driven by a gear 28 meshing with gear 29 on shaft 30. As shown in Fig. 6 a series of notches 31 are provided in the periphery of the turret, there being a notch for each station, to receive the end 32 of the locking bolt 33 to lock and hold the turret in its proper position between the indexing operations. The locking bolt 33 is mounted to slide in a guide 34 in the housing, and a spring 35 tends to push it inwardly to locking position. It is retracted from the notches 31 to unlock the turret for indexing operations at the proper time by means of an arm 36 engaging a shoulder 37 on the bolt, and this arm is mounted on the short shaft 38 which has another arm 39 carrying a roller 40 running on a cam 41 on the shaft 30. It will therefore be seen that the shaft 30 carrying the cam 41 and the shaft 27 carrying the indexing arm 24 are connected by the two gears 28 and 29, and the locking bolt 33 is operated in timed relation with the indexing mechanism to unlock the turret just prior to the indexing operation and to then again lock the turret immediately after the indexing operation is completed and thus retain the turret in proper position until it is time for the next indexing operation.

The shaft 30 extends upwardly into the upper portion 4 and is driven by worm gear 42 meshing with worm 43 on a shaft 44 driven by a pulley 45 from any suitable source of power, not shown. During the operation of the machine the shaft 44 is driven continuously so that the shafts 30 and 27 are also driven continuously.

The station at the front of the machine indicated by the work holder L is the loading station where the finished work pieces are removed from the holders as they come to this position and unfinished pieces are placed in the holders to be carried in succession by indexing of the turret to the different working stations. While the spindles are at the loading station they are not driven and therefore means is provided to automatically release the driving clutch 14 of the spindle moving to this station as the turret is indexed. This releasing means is shown in Fig. 7, each clutch including a pivoted lever 46 pivoted at 47 and carrying a roller 48. As the turret is indexed the roller 48 on the clutch of the spindle moving into the loading station runs up on the cam 49 releasing the friction disc 14 from the cooperating clutch member on the driving gear 15 and thus releasing the drive for the spindle while it is in the loading position. Upon the next indexing movement of the turret the roller 48 runs off the cam 49 permitting the clutch spring 50 to shift the clutch disc 14 into engagement and thus the spindles are driven while in the other stations.

In the present machine there are two working stations so that there are two grinding operations performed on the work pieces in succession as they are carried around by the turret. The first is a rough or preliminary grinding operation performed by the grinding wheel 22 and the second is a finishing grinding operation performed by the wheel 23. These wheels are carried by spindles 51 (Fig. 5) running in suitable bearings in a head or slide 52, (Figs. 1, 2 and 5) this head or slide being adapted to reciprocate toward and from the turret in suitable guides 53 in the uprights 3, and as each head or slide is reciprocated it carries with it the spindle 51 and the grinding wheel 22 or 23 as the case may be. The spindle 51 carries a grooved pulley 54 (Fig. 1) driven by any suitable means such as flexible belts 55 driven by an electric motor 56 mounted on the head or slide 52.

In operation of the machine the heads or slides 52 are moved away from the turret during an indexing operation of the turret so as to clear the work and then are brought back to the grinding position after the indexing operation. This position is definitely determined by mechanism presently to be described, and during the grinding operation the wheel is fed from this position automatically from the device which determines the position of the wheel at the beginning of the grinding operation, and there is a separate and distinct adjustable positioning means associated with each work holder or spindle so that the grinding wheel is accurately positioned for each individual work holder or work piece and thus gives the desired grinding operation.

As will be seen from Figs. 1, 5 and 12 to 15 there are a pair of adjustable stops 57 and 58 associated with each work carrying spindle 9 and work holder 12. As shown they can be conveniently located on opposite sides of the axis of the spindle, and are mounted on the turret so as to be indexed with the turret. As shown in Figs. 12 to 15 these stops comprise screws mounted in split blocks 59 extending into recesses in the turret and secured to the turret by any suitable means such as by screws 60. These stop screws have heads 61 so that they may be adjusted by a suitable wrench, and after being adjusted they can be clamped in adjusted position by the clamping screws 62 clamping the split head portion 63 of the holders on to the screw. One of these stops as 58 is used for positioning and controlling the feed of the grinding wheel 22, while the other stop 57 is used to position and control the feed of the wheel 23.

In each head or slide 52 is a feed screw or shaft 64 having a threaded portion 65 threaded into a nut 66 carried by the head 52 and secured thereto by any suitable means such as the screws 67. These screws may also secure about the inner end portion of this shaft a cap 68 carrying suitable packing 69 to prevent leakage of oil from the screw. This end portion of the screw 64 indicated at 70 projects beyond this cap and forms an abutment to engage the stops 57 and 58 when the slide or head 52 is shifted inwardly toward the turret to bring the grinding wheels to the grinding position and thus determine the position of the grinding wheel at the beginning of the grinding operation. This end or abutment 70 of the screw or shaft 64 also remains in engagement with the stop 57 or 58 during the grinding operation and cooperates with this stop to control the feed of the grinding wheel during the grinding operation.

Figure 4:
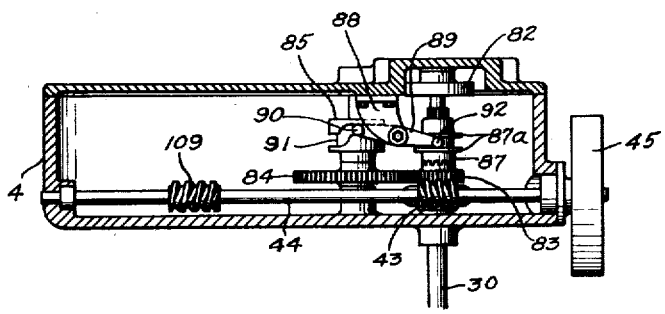
Fig. 4 is a detail sectional view through a portion of the casing and showing in elevation a part of the driving mechanism.

This is accomplished by the mechanism shown more clearly in Figs. 1, 2, 5, and 16 to 19. At the outer ends of the heads 52 are springs 71 reacting against abutments 72 carried by the frame of the machine and tend to force these heads 52 inwardly toward the turret and the work pieces. These heads together with the grinding wheels are each retracted or moved outwardly away from the turret automatically at the end of the grinding operation and just before the indexing of the turret by a pivoted fork 73 on a shaft 74, this fork engaging a shoulder 75 on a sleeve 76 mounted on the screw or shaft 64. This shaft 74 is mounted in suitable bearings carried by the frame and has at its upper end an arm 77 connected by link 78 with an arm 79 of a bell crank lever pivoted at 79a, the other arm 80 of which carries a roller 81 running on a cam 82 mounted on the upper end of the shaft 30. This cam however is only driven intermittently from the shaft 30 to retract the heads 52 and the grinding wheels during the indexing operation of the turret. This is accomplished by the mechanism shown in Figs. 2, 4 and 7. On the shaft 30 is a pinion 83 meshing with a gear 84 driving a cam 85. The pinion 83 on its upper side as shown in Fig. 7 has one member 86 of a toothed clutch meshing with the other member 87 splined to the shaft 30 to rotate with it but slidable longitudinally thereon. Between the shaft 30 and the cam 85 is a bracket 88 carrying a lever 89 one end of which carries a roller 90 running in the cam groove 91 in the cam 85 and the other end has a roller 92 running between flanges 87a on the clutch member 87. As the offset in the cam groove 91 shifts the lever 89 it shifts the clutch member 87 to or from the clutch member 86 to place the member 87 into driving engagement with the shaft 30 or release it therefrom, and therefore the drive of the cam 82 controlling the retracting of the heads 52 is controlled by this cam 85 in certain timed relation with the indexing of the turret.

Feed of tool

After the cam 82 permits the heads 52 to be shifted inwardly by the springs 71 to carry the grinding wheels inwardly to the grinding position against the work, which position is determined by the end 70 of the screw 64 engaging one of the stops 57 or 58, depending on whether it is the right hand or left hand grinding wheel, the screw 64 is turned through a suitable arc to cause the wheel to be fed toward the work during the grinding operation to secure the amount of grinding desired. This is accomplished by mechanism shown more clearly in Figs. 2 and 16 to 19. The sleeve 76 on the screw or shaft 64 carries a housing 93 enclosing a worm gear 94 mounted on the end of the shaft or screw 64 and keyed to this shaft. This gear meshes with a worm 95 mounted in suitable bearings in the housing, and on one end of which is a toothed ratchet 96 operated by a pivoted pawl 97 on an arm 98 of a bell crank lever, another arm 99 of which has a lug 100 adapted under certain conditions to engage an adjustable stop 101 mounted on the frame. This bell crank also carries an arm 102 to which is attached a spring 103 tending to hold this arm against a stop 104, this spring being connected at one end to the arm 102 and at the other end to this stop as shown in Fig. 19. The opposite end of the shaft carrying the worm 95 may have a non-circular end, such as the square end 105, to receive a wrench or hand crank for hand operation of the worm to adjust the feeding screw 64.

After the indexing of the turret the cam 82 and the fork 73 operated thereby permit the head 52 and the grinding wheel to be shifted inwardly by the springs 71 to bring this wheel to the grinding position. This position also brings the end 70 of the screw 64 against one of the stops 57 or 58 as the case may be to determine the proper position of the grinding wheel with respect to the work at the beginning of the grinding operation. After this has been accomplished the screw 64 is operated by turning it a partial revolution while it is in engagement with the stop 57 or 58 to permit feeding of the grinding wheel forwardly during the grinding operation an amount depending on the amount of grinding to be done. As the end 70 remains against the stop on the turret these two members control and determine the feed of the grinding wheel. In other words the feed of the wheel is really from the stop or point 57 or 58.

Figure 2:
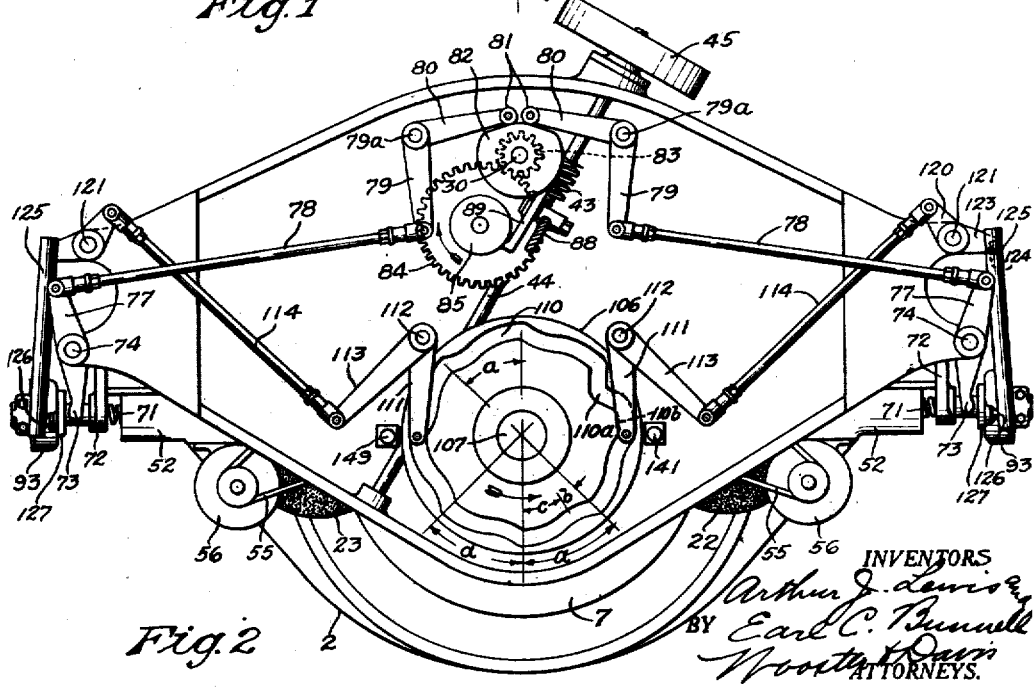
Fig. 2 is a top plan view thereof.
Figure 3:
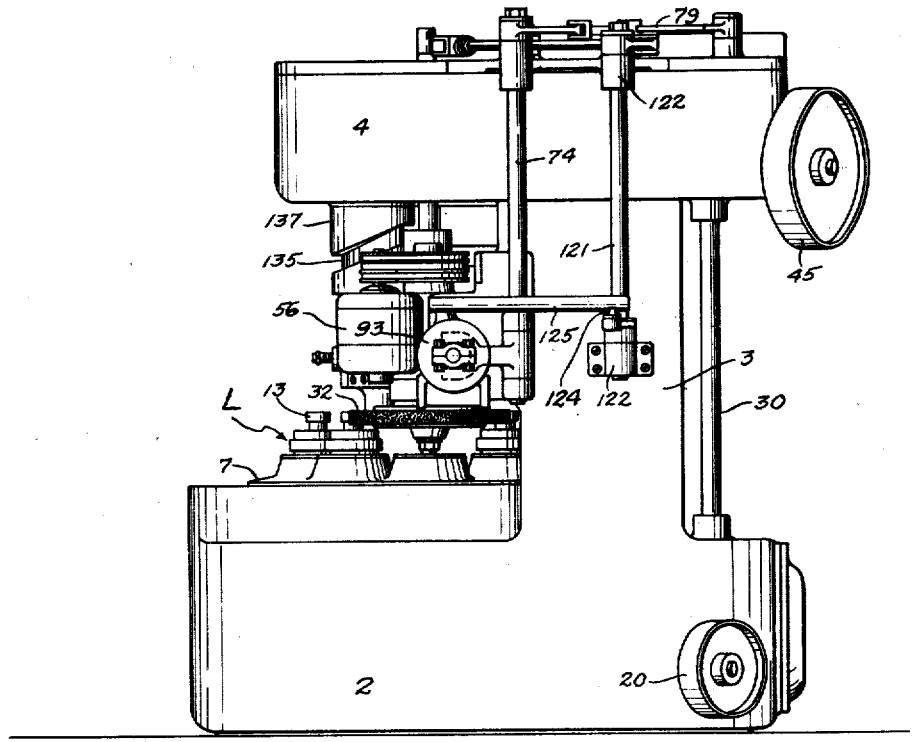
Fig. 3 is a side elevation looking from the right of Figs. 1 and 2.

The mechanism for turning the screw 64 to give this feed is shown more clearly in Fig. 2. As will be seen there is mounted in the upper part 4 of the housing a cam 106 mounted to turn on the extension 107 of the post 5. This cam is rotated at a constant uniform speed by a worm wheel 108 meshing with a worm 109 on the shaft 44. In the top of this cam is a cam groove 110 in which a roller on the arm 111 of a bell crank runs. This bell crank is pivoted at 112 and the other arm 113 is connected to a link 114 which is connected at its other end to an arm 120 on a shaft 121 mounted in suitable bearings 122 on the frame. This shaft carries a second arm 123 connected by a universal pivotal connection 124 to a connecting rod 125. A similar universal pivotal connection 126 connects the other end of this rod or link to the arm 127 on the sleeve 76 and therefore is also connected to the housing 93. It will be evident therefore that operation of the bell crank 111 will shift the sleeve 76 and the housing 93 and with them the screw 64 to turn it a limited amount, and the thread 65 being such that when this screw 64 is turned to the left or counterclockwise as viewed in Figs. 12 to 18 the screw tends to back away from the stop 58 (or 57 if wheel 23 is being fed), but as the head 52 is constantly urged forward by the springs 71, as the screw 64 is turned in this direction, instead of backing away from the stop 58 (or 57), it is retained in engagement therewith by the springs 71, but the head 52 and the grinding wheel 22 (or 23) carried thereby is fed forwardly toward the work an amount depending on the turning movement imparted to the screw 64. As will be evident this turning movement is controlled by the cam slot 110 (Fig. 2). As there are seven work carrying spindles 9 on the turret and therefore seven possible working stations there are seven feeding portions in the cam groove 110. One of these is indicated by the section a (Fig. 2) of the cam groove, the inwardly inclined portion b being the portion where the screw 64 and sleeve 76 are turned to the right or clockwise to return the screw after a feeding and grinding operation, and this motion takes place while the head 52 and the grinding wheel is withdrawn outwardly away from the work and is the time at which the indexing of the turret takes place. The outwardly inclined portion c of the cam groove turns the screw back or counterclockwise and feeds the grinding wheel during the grinding operation. It will be seen, as indicated above, that there are seven of these sections a in the cam groove, one for each work holder or work spindle.

*Compensating for wear of wheels and redressing them*

Means is also provided for pressing the grinding wheels automatically after a given number of grinding operations to keep the wheel sharp and in the best working condition, and before each dressing operation the wheel is automatically advanced or positioned to compensate for the wear and change in the size of the wheel and to properly position it for the dressing operation, which also gives it the proper size for the desired grinding operation to give accurate and uniform work on the different work pieces. This mechanism for automatically dressing the grinding wheel is shown in Figs. 7 to 11, and the automatic compensating means for setting the position of the wheels before the dressing is shown in Figs. 16 to 19.

It is to be particularly noted that this dressing means automatically redresses the wheel to a certain definite relation to the tool feed control means and thus gives much more accurate and uniform operation on the work pieces.

*Resetting of grinding wheel*

Before this dressing operation the position of the wheel is reset or advanced to compensate for wear of the wheel, and the redressing operation performed on the wheel brings the wheel again to the proper diameter for accurate grinding. This dressing also brings the surface of the wheel to best condition for grinding and accurately to shape. This resetting mechanism is shown in Figs. 16 to 19. It will be seen from Fig. 2 that the cam groove 110 has an inwardly extending offset 110a and this is so located that the roller on the arm 111 runs into it during the indexing of the turret immediately before the dressing operation on the wheel. As shown in Fig. 2 the offset 110a has just passed the roller on arm 111, that is the roller has just passed through the offset as the cam 106 rotates, which has reset the wheel 22, and while the roller was on the high part 110b of the cam the dressing of wheel 22 took place as will presently be described, bringing the parts to the position shown in Fig. 8. In other words this roller runs into the offset 110a during the indexing operation just prior to the dressing operation swinging the arm 127 (Fig. 17) clockwise or to the right. This offset is deeper than the incline b of the seven portions a and therefore carries the housing 93 into the position shown in Fig. 17 and brings the lug 100 against the stop 101. This swings the arm 99 to the left relative to housing 93 and with it the arm 98 carrying the pawl 97. This turns the ratchet 96 to the left as viewed in Fig. 19, and therefore turns the worm 95 to rotate the worm wheel 94 and with it the screw 64 a sufficient distance to draw it back an amount desired to compensate for reduction in the diameter of the grinding wheel due to wear and also the dressing operation. As the roller on arm 111 runs out of the offset 110a the housing 93 is swung back to the left to remove the lug 100 from the stop 101, permitting the spring 103 to swing the arm 99 and the pawl 97 to the right to shift the pawl into the next notch in the ratchet 96 for the next resetting operation of the grinding wheel.

*Dressing of grinding wheels*

After the resetting operation the dressing of the surface of the grinding wheel takes place.

Referring first to Figs. 7 to 11, Fig. 8 is a view looking from the front of the machine toward the loading station L with the roughing wheel 22 at the right and the finishing grinding wheel 23 at the left. As previously indicated, although there are eight stations on the turret only seven of them are occupied by work holders 12, the eighth indicated by the station 21 having no holder but carrying a dressing device for dressing the grinding wheels. It will therefore be seen that this dressing device is carried by the turret and is indexed with it to bring the dressing device alternately into position to dress the surfaces of the two grinding wheels after each wheel has performed a given number of grinding operations, in the present instance seven.

This dressing device comprises an upright rod or bar 128 mounted for vertical sliding movements in bearings 129 and 130 (Fig. 1) on the turret. Adjustably mounted on this rod are two diamond points or cutters 131 and 132, these being spaced vertically a sufficient distance so that in an intermediate position, as indicated in Fig. 8, they are on opposite sides of a grinding wheel. These diamonds are mounted so as to be adjustable toward and from the grinding wheel to place them in proper dressing position. The rod 128 carries a head 133 on one side of which is a roller 134 adapted to run in cam grooves 135 and 136 in the side walls of a stationary cam 137, this cam, as will be seen from Fig. 7, being secured to the upper portion 4 for the housing by any suitable means such as screws 138. On opposite sides of this cam in alignment with the grinding wheels are vertical grooves 139 and 140 into which the grooves 135 and 136 run at their opposite ends.

Opposite the groove 139 is an upright bar 141 mounted for vertical sliding movement in suitable bearings 142 and 143 in the upper and lower walls of the upper portion 4 of the housing, and this bar carries a roller 144 running in a cam groove 145 in the side of the constantly rotating cam 106. At its lower end this bar 141 is provided with a lateral notch 146 adapted to receive a lug 147 on the head 133 carried by the rod 128 to connect the rod 128 and bar 141 together during the wheel dressing operation.

Fig. 9 shows the parts in the position they occupy at the end of an indexing operation of the turret which has carried the dressing rod 128 into the dressing position opposite the grinding wheel 22. During this indexing operation the movement of the turret, carrying with it the rod 128, has caused the roller 134 to run up the inclined groove 135 in the cam 137. At the same time the roller 144 on the bar 141 is running in the horizontal portion of the cam groove 145 in the constantly rotating cam 106 and this has positioned the notch or recess 146 in alignment with the lug 147 as the rod 128 runs out of the inclined groove 135 into the upright groove 139. This lug 147 is now seated in the notch 146 and the two rods 141 and 128 are therefore connected together. Continued movement of the cam 108 causes the roller 144 to run down the offset or inclined portion 148 (Fig. 7) of the cam groove 145 and therefore shifts the rod 128 and the diamonds 131 and 132 downwardly to the position shown in Fig. 8. It will thus be seen this movement passes the diamond 132 across the face of the grinding wheel 22 and dresses it to break up and sharpen the grinding particles, remove metal which may have been held by the wheel, true up the surface and bring the wheel to the proper diameter for the next grinding operations.

It will be noted from Figs. 14 and 15 that on the turret 7 adjacent the grinding wheel redressing device 128 are adjustable stops 57a and 58a corresponding to the stops 57 and 58 associated with the work holders. During the redressing operation of the wheel 22 the end of the feed control means or feed screw 70 is against the stop 58a which properly positions the wheel 22 in proper position relatively to the diamond point 132. Therefore the surface of the wheel will be redressed to a certain definite relation to the tool feed control means 70. This is an important feature of this arrangement in that the wheel is automatically dressed to the proper relation to the work, giving much more accurate and uniform grinding of this work. In redressing the other wheel 23 the member 70 is against the stop 57a and thus this wheel is also redressed to a certain definite relation to the tool feed control means.

It will be seen that during the dressing of wheel 22 the roller 134 has moved downwardly in the upright slot 139 and is in the upper dotted line position shown in Fig. 11 in alignment with the entrance to the slot 136. On the next indexing operation of the turret this roller runs into the groove 136 and the lug 147 moves out of the notch 146, thus releasing the rod 128 from the bar 141. The rod 128 is carried around with the roller 134 in the groove 136, and as this groove is horizontal the rod 128 is held in the position corresponding with that of Fig. 8 until it reaches a position opposite the finishing wheel 23. It will be understood that at this time the diamonds 131 and 132 are positioned on opposite sides of the wheel 23, but that during the previous indexing operation of the turret to bring the rod 128 to this position the wheel 23 has been reset to compensate for wear etc., by the offset 110a of cam groove 110 and the mechanism controlled thereby, including the housing 93, stop 101, ratchet 96, screw 64 and so forth on the left hand side of the machine and associated with the wheel 23.

At this time the roller 134 runs out of the horizontal groove 136 into the upright groove 140 on the left hand side of the cam 137. At this side of the cam is an upright bar 149 similar to the bar 141 and mounted for vertical sliding movements in the top and bottom walls of the upper portion 4 of the housing, the same as is the bar 141. The bar 149 also carries a roller 150 running in the cam groove 145, and has a notch or recess 151 at its lower end similar to the notch 146 in the bar 141. As the rod 128 comes into position to carry the roller 134 into the upright cam groove 140 the roller 150 is running in the horizontal portion of the cam groove 145 and has positioned the notch 151 in alignment with the lug 147 carried by the rod 128, and this lug is carried into this notch so that the rod 128 is now connected to the bar 149. The roller 150 now runs down the inclined portion 148 of the cam groove 145 and carries the upper diamond 131 downwardly across the face of the grinding wheel 23, dressing the face of this wheel the same as the diamond 132 did the face of the wheel 22. Now the roller 134 is in the upright groove 140 and is in alignment with the lower end of the inclined groove 135 of the stationary cam 137 as shown by the lower dotted position of Fig. 11. On the next indexing operation of the turret this rod 128 of course moves with the turret carrying the roller 134 into the inclined groove 135 and carrying the lug 147 out of the notch 151 to disconnect the rod 128 from the bar 149. While the turret is being indexed to carry this dressing rod 128 to the other grinding wheel 22 the roller 134 runs up the inclined cam groove 135 and brings it opposite the wheel 22. As shown in Fig. 9 it will be seen that the rod 128 has again been brought to its upper position with the diamond 132 above and opposite the grinding wheel 22 ready for another dressing operation on this wheel.

It will therefore be seen from the above that the various operations for disconnecting the drive for the work holders in the loading station, connecting the drive to these spindles after they leave the loading station, the step by step indexing operation of the turret, the positioning and feeding operations of the grinding wheels, the resetting of the grinding wheels to compensate for wear and the periodic dressing of the grinding wheels, are all performed automatically and in certain timed relation, so that after the machine is set up the operator merely removes finished work from the holder at the loading station and inserts an unfinished work piece in this holder between the indexing operations and while the grinding operations on other pieces are being performed. It will also be seen that the grinding wheels, or other tools as the case may be, are automatically positioned with respect to each individual piece of work prior to or at the beginning of the working operation on that piece by an individual adjustable stop or feeding point associated with each work piece, and that the feed of the tool, or in the embodiment shown the grinding wheel, is from this stop or point and is controlled automatically from this point during the working operation. It will also be seen that with the embodiment shown, after a given number of grinding operations the wheel is automatically reset to compensate for wear, and the surface of each grinding wheel is automatically dressed to keep it in proper condition for the best and most accurate grinding.

Also, as pointed out above, although this invention has been shown as embodied in a grinding machine it is not limited to such a machine, but is adapted for other machine tools or machine tool operations, such as chucking machines, boring, turning, and other operations as will be understood.

Having thus set forth the nature of our invention, what we claim is:

1. A machine tool comprising a rotatable work carrying turret, a plurality of work holders on the turret, a head movable toward and from the turret, a tool carried by said head, a feed stop on the turret associated with each work holder, and feeding means on the head arranged to engage the stop to position the tool relative to the work and to feed the tool therefrom during the working operation.

2. A machine tool comprising a rotatable work carrying turret, a plurality of work carrying spindles on said turret, means for indexing the turret, a stop associated with each spindle and indexable with the turret, a tool carrier, an abutment movable with the carrier, means for shifting the carrier to bring said abutment against a stop to position a tool relative to work carried by a spindle at the beginning of a working operation, and means for feeding the tool from the stop during the working operation.

3. A machine tool comprising a rotatable work carrying turret, a plurality of work carrying spindles on said turret, means for indexing the turret, a stop associated with each spindle and indexable with the turret, a tool carrier, means for shifting the carrier to bring the tool to working position adjacent a spindle, an abutment movable with the carrier arranged to come against the stop on said shifting movement to position the tool relative to the work on said spindle at the beginning of the working operation, means for feeding the tool, and means including said abutment controlling said feed from the stop during the working operation.

4. A machine tool comprising a holder for work, a carrier for a tool movable toward and from the work, a stop means, adjusting means on the carrier, means tending to shift the carrier to hold the adjusting means against the stop means to position the tool relative to the work during the working operation, and means for operating the adjusting means during the working operation to shift the carrier by reaction against the stop means to feed the tool relative to the work.

5. A machine tool comprising a rotatable work carrying turret, a plurality of work holders on the turret, a carrier for a tool movable toward and from the turret, means for indexing the turret to bring the individual work pieces successively to working position, an adjustable stop on the turret associated with each work holder, and adjustable means on the carrier adapted to engage the stop means at the working position, means tending to move the head toward the turret and retain the adjusting means against said stop means to position the tool relative to the work, and means for operating the adjusting means during the working operation to shift the carrier by its reaction against the stop and feed the tool relative to the work.

6. A machine tool comprising a rotatable work carrying turret, a plurality of work holders on the turret, a carrier for a tool movable toward and from the turret, an adjustable feeding point on the turret associated with each work holder, and feeding means on the carrier arranged to engage the points in succession and feed the tool therefrom relative to the work during the working operations.

7. A machine tool comprising a rotatable turret, a plurality of work holders on said turret, means for indexing the turret, an adjustable stop associated with each work holder, a carrier for a tool, a screw connected with said carrier and having an associated abutment to engage the stops to position the tool relative to the work in the holders, and means operated in timed relation with the indexing operation for turning the screw during the working operation and while the abutment is in engagement with a stop to cause relative feeding movement between the work and the tool.

8. In a grinding machine comprising a holder for the work, a head movable toward and from the work, a spindle on the head carrying a grinding wheel, a stop means having a given position relative to the holder, adjusting means on the head, means tending to shift the head to hold the adjusting means against the stop means to position the wheel relative to the work, and means for operating the adjusting means during the grinding operation to shift the head by reaction against the stop means.

9. In a grinding machine, a rotatable work carrying turret, a plurality of work holders on the turret, a head movable toward and from the turret, a spindle on the head carrying a grinding wheel, means for indexing the turret to bring the individual work pieces successively to the grinding wheel, an adjustable stop on the turret associated with each work holder, an adjusting means on the head adapted to engage the stop means, means tending to move the head toward the turret and retain the adjusting means against the stop means, and means for operating the adjusting means during the grinding operation to shift the head by its reaction against the stop.

10. In a grinding machine, a rotatable work carrying turret, a plurality of work holders on the turret, a head movable toward and from the turret, a spindle on the head carrying a grinding wheel, an adjustable feeding point on the turret associated with each work holder, and feeding means on the head arranged to engage the points in succession and feed the wheel therefrom during the grinding operations.

11. A grinding machine comprising a rotatable turret, a plurality of work holders carried by the turret, a movable head, a spindle carried by said head, a grinding wheel on the head, means for indexing the turret to bring the work successively to the grinding position, means operated in timed relation with the indexing operation to shift the wheel slightly only after a plurality of grinding operations to reset its position to compensate for wear during said plurality of operations, and means for automatically dressing the surface of the wheel after the resetting operation.

12. A grinding machine comprising a plurality of work holders, a grinding wheel, means for relatively shifting the work holders and the wheel to grind the pieces in succession, means operated in certain timed relation with the shifting means to reset the wheel only after a plurality of grinding operations to compensate for wear of the wheel during said operations, and means operated in timed relation with the shifting and resetting means to then dress the surface of the wheel.

13. A grinding machine comprising a rotatable turret, a plurality of work holders carried by the turret, a grinding wheel, means for indexing the turret to bring the work in succession to grinding position at the wheel, a dressing device carried by the turret to recondition the surface of the wheel, and means operated in certain timed relation with the indexing means to cause relative movement between the wheel and the dressing device after a plurality of grinding operations to dress the surface of the wheel.

14. A grinding machine comprising a rotatable turret, a plurality of work holders carried by the turret, a grinding wheel, means for indexing the turret to bring the work in succession to grinding position at the wheel, a dressing device movable with the turret and brought into position adjacent the wheel by indexing movements of the turret, and means operated in certain timed relation with the indexing operation to cause relative movement between the wheel and the dressing device to recondition the surface of the wheel.

15. A grinding machine comprising a rotatable turret, a plurality of work holders carried by the turret, a plurality of grinding wheels located at different positions about the turret, means for indexing the turret to bring the holders in succession to grinding position adjacent the wheels, a dressing device for reconditioning the surfaces of the wheels and movable with the turret to carry it to the wheels in succession, and means to cause relative movement between a wheel and the dressing device after the device is shifted to a position adjacent the wheel to recondition the surface of the wheel.

16. A grinding machine comprising a rotatable turret, a plurality of work holders carried by the turret, a plurality of grinding wheels located at different positions about the turret, means for indexing the turret to bring the holders in succession to grinding position adjacent the wheels, a dressing device comprising a carrier for a plurality of dressing tools and movable with the turret to carry the device to the wheels, means associated with one wheel location to shift the carrier to move one tool across the surface of the wheel to dress it, and means associated with another wheel location to shift another tool across the surface of this wheel to dress it.

17. The grinding machine of claim 16 in which there is means for automatically resetting each grinding wheel just prior to the dressing operation to compensate for wear of the wheel.

18. A grinding machine comprising a holder for the work, a head movable toward and from the work, a spindle on the head carrying a grinding wheel, a stop means associated with the holder, adjusting means on the head for engaging said stop means during the grinding operation to position the wheel relative to the work, automatic means for operating the adjusting means to feed the wheel from said stop during the grinding operation, and means to dress the wheel to a certain definite relation to said adjusting means.

19. A grinding machine comprising a rotatable turret, a plurality of work holders on the turret, a head movable toward and from the turret, a spindle on the head carrying a grinding wheel, an adjustable stop on the turret associated with each work holder, feeding means on the head arranged to engage a stop and feed the wheel therefrom during the grinding operation, means for indexing the turret to bring the work successively to the grinding position, and means to dress the wheel to a certain definite relation to the feeding means.

20. A grinding machine comprising a work holder, a stop associated with said holder, a grinding wheel, feed means associated with said wheel arranged to engage said stop to position the wheel relative to the work and relatively feed the wheel and the work from the stop during the grinding operation, a second stop in definite relation to the first stop, and means to dress the wheel in certain definite relation to said feed means while the feed means is in engagement with the second stop.

21. A grinding machine comprising a rotatable work carrying turret, a plurality of work holders on the turret, a head movable toward and from the turret, a spindle on said head carrying a grinding wheel, a feed stop on the turret associated with each work holder, and feeding means on the head arranged to engage the stop to position the wheel relative to the work and to feed the wheel therefrom during the grinding operation.

22. A grinding machine comprising a rotatable work carrying turret, a plurality of work carrying spindles on said turret, means for indexing the turret, a stop associated with each spindle and indexable with the turret, a carrier, a spindle on the carrier carrying a grinding wheel, an abutment movable with the carrier, means for shifting the carrier to bring said abutment against a stop to position the wheel relative to work carried by a spindle at the beginning of a working operation, and means for feeding the wheel from the stop during the grinding operation.

23. A grinding machine comprising a rotatable work carrying turret, a plurality of work holders on the turret, a head movable toward and from the turret, a grinding wheel carried by said head, a feed stop on the turret associated with each work holder, and feeding means on the head arranged to engage the stop to position the wheel relative to the work and to feed the wheel therefrom during the grinding operation.

24. A grinding machine comprising a rotatable work carrying turret, a plurality of work carrying spindles on said turret, means for indexing the turret, a stop associated with each spindle and indexable with the turret, a carrier for a grinding wheel, an abutment movable with the carrier, means for shifting the carrier to bring said abutment against a stop to position the wheel relative to work carried by a spindle at the beginning of a grinding operation, and means for feeding the wheel from the stop during the grinding operation.

ARTHUR J. LEWIS.
EARL C. BUNNELL.

---

CERTIFICATE OF CORRECTION.

Patent No. 2,145,310. January 31, 1939.

ARTHUR J. LEWIS, ET AL.

It is hereby certified that error appears in the printed specification of the above numbered patent requiring correction as follows: Page 4, first column, line 16, for the word "pressing" read dressing; and that the said Letters Patent should be read with this correction therein that the same may conform to the record of the case in the Patent Office.

Signed and sealed this 15th day of August, A. D. 1939.

(Seal)

Leslie Frazer
Acting Commissioner of Patents.

turret, a plurality of grinding wheels located at different positions about the turret, means for indexing the turret to bring the holders in succession to grinding position adjacent the wheels, a dressing device for reconditioning the surfaces of the wheels and movable with the turret to carry it to the wheels in succession, and means to cause relative movement between a wheel and the dressing device after the device is shifted to a position adjacent the wheel to recondition the surface of the wheel.

16. A grinding machine comprising a rotatable turret, a plurality of work holders carried by the turret, a plurality of grinding wheels located at different positions about the turret, means for indexing the turret to bring the holders in succession to grinding position adjacent the wheels, a dressing device comprising a carrier for a plurality of dressing tools and movable with the turret to carry the device to the wheels, means associated with one wheel location to shift the carrier to move one tool across the surface of the wheel to dress it, and means associated with another wheel location to shift another tool across the surface of this wheel to dress it.

17. The grinding machine of claim 16 in which there is means for automatically resetting each grinding wheel just prior to the dressing operation to compensate for wear of the wheel.

18. A grinding machine comprising a holder for the work, a head movable toward and from the work, a spindle on the head carrying a grinding wheel, a stop means associated with the holder, adjusting means on the head for engaging said stop means during the grinding operation to position the wheel relative to the work, automatic means for operating the adjusting means to feed the wheel from said stop during the grinding operation, and means to dress the wheel to a certain definite relation to said adjusting means.

19. A grinding machine comprising a rotatable turret, a plurality of work holders on the turret, a head movable toward and from the turret, a spindle on the head carrying a grinding wheel, an adjustable stop on the turret associated with each work holder, feeding means on the head arranged to engage a stop and feed the wheel therefrom during the grinding operation, means for indexing the turret to bring the work successively to the grinding position, and means to dress the wheel to a certain definite relation to the feeding means.

20. A grinding machine comprising a work holder, a stop associated with said holder, a grinding wheel, feed means associated with said wheel arranged to engage said stop to position the wheel relative to the work and relatively feed the work and wheel from the stop during the grinding operation, a second stop in definite relation to the first stop, and means to dress the wheel in certain definite relation to said feed means while the feed means is in engagement with the second stop.

21. A grinding machine comprising a rotatable work carrying turret, a plurality of work holders on the turret, a head movable toward and from the turret, a spindle on said head carrying a grinding wheel, a feed stop on the turret associated with each work holder, and feeding means on the head arranged to engage the stop to position the wheel relative to the work and to feed the wheel therefrom during the grinding operation.

22. A grinding machine comprising a rotatable work carrying turret, a plurality of work carrying spindles on said turret, means for indexing the turret, a stop associated with each spindle and indexable with the turret, a carrier, a spindle on the carrier carrying a grinding wheel, an abutment movable with the carrier, means for shifting the carrier to bring said abutment against a stop to position the wheel relative to work carried by a spindle at the beginning of a working operation, and means for feeding the wheel from the stop during the grinding operation.

23. A grinding machine comprising a rotatable work carrying turret, a plurality of work holders on the turret, a head movable toward and from the turret, a grinding wheel carried by said head, a feed stop on the turret associated with each work holder, and feeding means on the head arranged to engage the stop to position the wheel relative to the work and to feed the wheel therefrom during the grinding operation.

24. A grinding machine comprising a rotatable work carrying turret, a plurality of work carrying spindles on said turret, means for indexing the turret, a stop associated with each spindle and indexable with the turret, a carrier for a grinding wheel, an abutment movable with the carrier, means for shifting the carrier to bring said abutment against a stop to position the wheel relative to work carried by a spindle at the beginning of a grinding operation, and means for feeding the wheel from the stop during the grinding operation.

ARTHUR J. LEWIS.
EARL C. BUNNELL.

---

CERTIFICATE OF CORRECTION.

Patent No. 2,145,310. January 31, 1939.

ARTHUR J. LEWIS, ET AL.

It is hereby certified that error appears in the printed specification of the above numbered patent requiring correction as follows: Page 4, first column, line 16, for the word "pressing" read dressing; and that the said Letters Patent should be read with this correction therein that the same may conform to the record of the case in the Patent Office.

Signed and sealed this 15th day of August, A. D. 1939.

Leslie Frazer
Acting Commissioner of Patents.

(Seal)